United States Patent Office 3,782,967
Patented Jan. 1, 1974

3,782,967
PREPARATION OF AN EATABLE YEAST PRODUCT
Bjorn Westphal Eriksen, Soborg, and Svend Danielsen, Copenhagen, Denmark, assignors to Aktieselskabet Dansk Gaerings-Industri, Cophenhagen, Denmark
Continuation of abandoned application Ser. No. 824,185, May 13, 1969. This application Apr. 17, 1972, Ser. No. 244,943
Int. Cl. A23j 1/18
U.S. Cl. 426—62
12 Claims

ABSTRACT OF THE DISCLOSURE

A process for preparing an eatable yeast product wherein a yeast material, preferably a yeast cream, is contacted, under conditions of vigorous agitation, with a hot oil or fat having a temperature above the boiling point of water at the actual pressure, preferably 150–210° C. Thereby, the yeast material is inactivated and dried, preferably to a water content of less than 5 percent by weight, and its taste is improved, becoming more or less silimlar to the taste of fried meat. The process is preferably carried out in a continuous manner in an elongated tubular reactor, the yeast material being introduced into a current of hot fat or oil in said tubular reactor.

---

Figure 1:
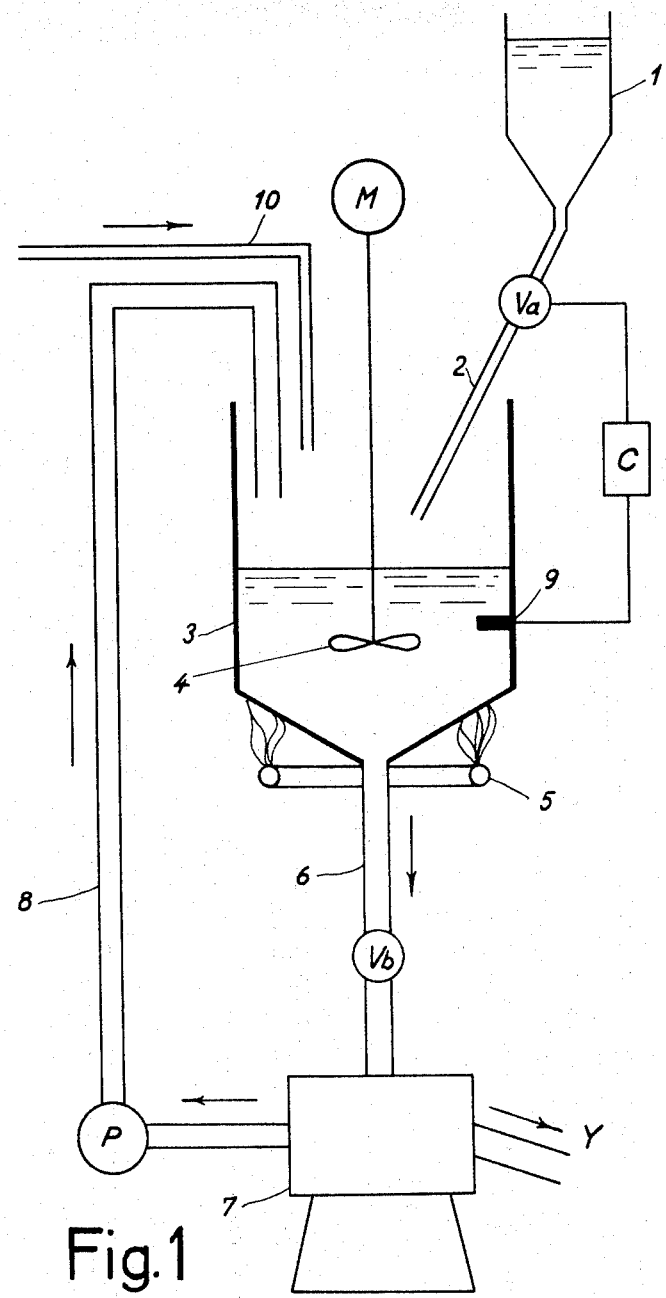

This application is a continuation of abandoned application Ser. No. 824,185 filed May 13, 1969.

BACKGROUND OF THE INVENTION

Inactivated yeast is known to have a high nutritional value owing to its high contents of proteins, B-vitamins and micro-nutrients.

Unfortunately, yeast inactivated by conventional drying methods and products containing considerable proportions thereof have a characteristic taste and odor that is disliked and definitely objected to by most people. Owing to this fact the amount of inactivated yeast used for direct consumption or used as a constituent of food for human beings is comparatively small.

SUMMARY OF THE INVENTION

We have found a process of treating different kinds of yeast and yeast-like fungi, by which treatment the said characteristic objectionable taste and odor may be removed whereby the said yeast can be inactivated and modified so as to obtain a flavor more or less neutral or more or less similar to the flavor of fried meat. The process may, furthermore, be performed in such economical manner that it constitutes an attractive general process for drying yeast for food or fodder application. This process constitutes one of the aspects of the present invention.

The process of the invention for preparing an eatable yeast product is characterized by contacting, under conditions of vigorous agitation, a yeast with an edible oil or fat having a temperature above the boiling point of water under the actual pressure conditions and maintaining the contact for a treating time sufficient to reduce the water content of the yeast to less than 15% by weight, calculated on the yeast dry matter.

The effect on the taste and odor obtained by this process is assumed to depend mainly on the removal of the objectionable constituents by distillation with the water vapors escaping, with or without previous thermal decomposition of the objectionable constituents of the yeast.

The obtainment of a product having desirable properties and of an economical process seems to be conditioned by the sudden exposure of the yeast to the hot oil under conditions of vigorous agitation ensuring effective contact between the oil and the yeast particles.

DETAILED DESCRIPTION

By the term "conditions of vigorous agitation" as used in the present specification and claims is meant conditions securing effective contact between the oil and yeast particles of such a small size that a substantially uniform product is obtained. In some cases, it is necessary to positively apply conditions of vigorous agitation by suitable means, e.g. by means of propellers or by otherwise applying energy to the resulting mixture of yeast material and oil, to obtain immediate subdivision of the yeast starting material into separate particles of a sufficiently small size to ensure a uniform product. In other cases, the contact with the hot oil may result in such vigorous turbulent "boiling" of the resulting mixture that the necessary conditions of vigorous agitation are obtained without applying any further agitation means or measures. It is essentail that the conditions of vigorous agitation prevail during the initial contacting of the yeast starting material with the hot oil, but it may not be necessary to meantain such conditions during the total treating time, although it is preferred to do so.

Throughout the present specification and claims, the term "yeast" is to be understood as covering yeast as well as more or less yeast-like fungi. It is generally known that certain fungi under some culturing conditions behave as moulds—and which are generally classified as moulds —may be grown under culturing conditions which suppress the formation of mycelium-like cells and more or less favor the development of more yeast-like cells; also such fungi are suitable for the purpose of the invention when grown under the conditions favoring the formation of yeast-like cells. The process of the invention may, furthermore, be carried out even with fungi having predominantly mycelium-like cells. In the process of the invention may be used yeasts and fungi grown on any assimilable carbon source, e.g., molasses, saccharified starch, waste water, and mineral oil or fractions thereof.

As examples of yeasts and fungi usable as yeast starting material for the process of the invention may be mentioned the following:

*Candida brumptii, Candida cantenulata, Candida clausenii, Candida humicola, Candida intermedia, Candida krusei, Candida lipolytica, Candida mycoderma, Candida melibiosi, Candida parapsilosis, Candida pulcherrima, Candida rugosa, Candida stellatoidea, Candida tropicalis, Candida utilis, Debaryomyces kloeckeri, Hansenula anomala, Pichia guilliermondii, Rhodotorula glutinis, Torulopsis jamata, Torulopsis magnoliae, Pichia polymorpha, Pichia fermentans, Pichia calliphorae, Pichia membraenefaciens Saccharomyces fragilis, Saccharomyces carlbergensis, Saccharomyces ellipsoideus, Saccharomyces cerevisiae,* fungi of the genus Penicillium, preferably *Penicillium expansum,* and fungi of the genus Aspergillus.

The preferred yeasts for use in the process of the invention are baker's yeast, torula yeast, de-bittered brewer's yeast, and waste yeast from the production of alcohol from molasses.

The yeasts used as starting material for the process of the invention may be in various forms. Examples of suitable forms are extrudates, granules, and, preferably, yeast cream.

The oil or fat used in the process of the invention may be any edible oil or fat, e.g. corn oil, peanut oil, lard, soya bean oil, palm oil or hydrogenated or partially hydrogenated palm oil, or hydrogenated or partially hydrogenated, deodorized fish oil. Among these, peanut oil is preferred when the product is to be used for human nutrition, because the best odor and taste of the product may be obtained by using this type of oil. When in the present specification and claims one of the terms "oil" and "fat" is used, it is to be understood as a common designation for oils as well as fats, except where the text deals with specific types of oil and fats.

While acceptable results are obtainable at any oil temperature in the range of 100–250° C., it will be understood that when working in the lower part of this temperature range it will be necessary to use rather long treating periods, up to several minutes, whereas only a short to ultrashort treating time is necessary and desirable when working in the higher part of the temperature range. The conditions should, of course, be so chosen that the desired drying effect and the desired effect on the taste of the yeast are obtained without risk of burning occurring, and the correct combination of treating temperature and treating time at the particular weight ratio of yeast starting material to oil may be ascertained by simple preliminary experiment. In practice, it has been found suitable to use an oil temperature in the range of 110–220° C., and it is, according to the invention, especially preferred that the oil temperature when initially contacting the yeast is 150–210° C., as operation within this temperature range will usually lead to the best results with respect to product flavor and process economy.

As stated above, the contact between the yeast and the oil is maintained for a treating time sufficient to reduce the water content of the yeast to less than 15% by weight, calculated on the yeast dry matter. (The water content values referred to in the present specification and claims are values calculated on the basis of the weight loss of the product after heating for 20 hours at 115° C. and atmospheric pressure.) If the water content is not reduced to less than 15%, the resulting yeast product will not have sufficiently improved taste, and it will have a tendency to agglomerate which renders it difficult to handle. Furthermore, such a yeast product having a water content of above 15% will have a short shelf life. Preferably, the water content of the yeast is reduced to less than 5% by weight, as this leads to yeast products having, in addition to improved taste and odor, particularly good manipulating properties and a long shelf life.

It will be understood that the extent of removal of water from the yeast and, on the whole, the effectiveness or severity of the process of the invention, depends upon a number of factors, such as oil temperature, treating time, and the ratio of the yeast starting material to the hot oil, or, expressed in another manner, upon any variable which influences the amount of heat transfer from the oil to the yeast. Accordingly, when it is stated above that the contact between yeast and oil is maintained for a treating time sufficient to reduce the water content of the yeast to less than 15% by weight (and preferably less than 5% by weight) this means that a treating time should be used which, at the particular values of the other process variables used, will lead to the desired extent of water removal.

The properties of the final yeast product will to some extent depend upon the choice of the various process variables which in combination result in the desired rate of water removal, and two yeast products prepared by the process of the invention and having the same low water content may, accordingly, differ from each other with respect to other properties, such as taste and particle size, if different combinations of process variables have been used for their preparation. The suitable combination of process variables to be used in order to obtain the best results in each particular case may be ascertained by preliminary tests.

After the treatment of the yeast with the hot oil or fat, the resulting yeast product may be separated from the oil by usual methods, such as decantation, filtration or centrifugation. The yeast product separated by decantation or filtration will usually have a fat content of 20–50%. If the yeast product is separated from the oil by centrifugation, this treatment alone may result in a product having a fat content of less than 15%, in some cases as little as 7–10% or even less.

If desired, the yeast product obtained in one of the above manners may be further treated, e.g. by solvent extraction, to reduce the fat content to very low values. The solvent extraction may, for example, be carried out using acetone or lower hydrocarbons as solvent. The extracted fat or oil and the solvent may be recovered, e.g. by distillation.

The fat or oil may be re-used several times. In order to avoid undesired accumulation of objectionable degradation products in the oil or fat it is, however, desirable that at least part of the fat or oil is removed and replaced by fresh oil or fat. Normally, a satisfactory oil or fat replacement may be obtained simply by adding fresh oil or fat to compensate for the oil or fat removed as constituent of the product.

The desired fat content of the final product will depend on several factors, for example, the intended final use of the product, and the type and cost of the oil or fat used for the process. When the process of the invention is carried out without performing any separating step, a mixture consisting of treated yeast product in mixture with fat or oil will result, and such a mixture may be a desirable product for certain purposes. In other cases, a product having as little fat content as possible will be desirable, for example when the cost of the fat or oil used makes the maximum recovery thereof desirable, when the final product is to be used as replacement or supplement to a natural food product containing only a small proportion of fat, or when the product is to be stored for longer periods at elevated temperature.

The process of the invention may be carried out in various manners. One of the most simple embodiments of the process of the invention comprises adding a batch of yeast in a suitable form, for example as a yeast cream, to a container containing a suitable amount of fat or oil at a temperature within the range stated above and heating to maintain the temperature within the said range, while agitating vigorously to ensure effective contact between the oil and the yeast particles and to avoid caking and sedimentation. After treatment for a suitable period, the resulting product is usually separated from the oil or fat, which may be re-used. Acceptable results have been obtained by a large number of runs conducted in this manner.

According to a more preferred embodiment of the invention, the process may be carried out in a continuous manner by adding the yeast starting material little by little to a vigorously agitated oil bath heated to the suitable contacting temperature, withdrawing from the bath a current of the resulting mixture of yeast product and oil, and recovering the yeast product from said withdrawn mixture. Preferably, the separated oil is recycled to the oil bath. The temperature of the oil in the container may be kept within the desired range, in this embodiment preferably 150–175° C., in various manners, e.g. by using temperature sensitive means such as a contact thermometer or a thermocouple, subjected to the bath temperature and governing the function of a control device controlling the oil heating rate and/or the feeding rate of the yeast to the bath.

For continuous operation, as well as for other embodiments of the process of the invention, it is generally preferred to use yeast cream as starting material, as it contains the yeast in finely suspended form and is easily pumpable and flowable. Furthermore, yeast from yeast-producing plants is usually obtained as yeast cream, which may then be used directly in the process of the invention.

The invention also relates to an apparatus for carrying out the above continuous process. This apparatus comprises a container for containing a bath of oil, means for heating the contents of the container, means for feeding yeast starting material from a yeast source to said container, means for agitating the bath in the container, a separating means communicating with the bath container and adapted to separate a mixture of yeast product and oil withdrawn from the container, said separating means having an outlet for separated oil communicating with the bath container so that the separated oil may be recycled to the container, and means for controlling the feeding rate of the yeast starting material and/or recycled oil to the bath and/or for controlling the heating intensity of the heating means. Preferably, the apparatus also comprises a temperature sensing device subjected to the bath temperature and governing the function of the said control means, so as to automatically maintain the bath temperature within the desired range, as well as means for introducing fresh replenishment oil into the system.

The bath container of the above apparatus may be an open container, from which the water vapor evolved by the process escapes from the oil surface into the surrounding atmosphere, or the container may be closed and the steam withdrawn through suitable conduit means, in which case the steam may be used for heating purposes elsewhere, for example, for preheating the yeast feed material. The oil heating means may be a gas or oil burner positioned under the container or an electric heating means, e.g. an electric heating jacket or a steam heating jacket surrounding the container. It is also possible to perform part of or all of the necessary heating through suitable heating means heating the recycled oil before it enters into the container. The separating means may be of any suitable type, such as a suction filter or a continuously working rotary suction filter, but is preferably a decanter (Bird's machine) or a filter centrifuge, suitably a continuously working filter centrifuge. If the separating means is of a type which needs periodical emptying, it is advantageous to use two or more units thereof in alternating operation in order to avoid stopping the continuous yeast treating process.

The control means governed by the temperature sensing device subjected to the bath temperature may, for example, be a magnetic valve connected with the temperature sensing device through a suitable control device.

When the above continuous process is used, the residence time of the yeast in the oil bath at the treating temperature will usually be a few minutes; by appropriate operation in small scale plants it is possible to obtain as short residence times as less than one minute. The best products are often obtained when using short residence times of the yeast in the oil at the treating temperature.

Very short residence times and very advantageous continuous operation may be obtained by employing another, especially preferred embodiment of the process of the invention.

This embodiment comprises introducing a suitable yeast starting material, preferably a yeast cream, into a current of oil having a suitable treating temperature, passing the resulting mixture through an elongated tubular reactor under conditions of vigorous agitation, allowing pressure release of the mixture at a downstream end of the reactor, whereby a substantial part of the steam originating from the water content of the yeast starting material escapes from the mixture, recovering the resulting yeast product from the mixture, and preferably recycling at least part of the oil of the mixture into the reactor so as to contact fresh yeast starting material.

This embodiment offers the advantage that very short treating times may be obtained, and that even at such short to ultra-short residence times of the yeast in the oil at treating temperature the treatment may easily be effectively controlled by regulating one or more of the process variables, such as the feeding rate of the oil and of the yeast starting material, and the temperature of the oil when brought into contact with the yeast. The necessary vigorous agitation may be provided simply by providing turbulent flow of the mixture in the reactor.

When operating in accordance with this embodiment of the process of the invention, residence times of fractions of a second may be employed to obtain the desired result, and a lighter and more neutral product may be obtained than when operating in accordance with the above embodiments using longer residence periods. Another significant advantage of this embodiment is that the necessary amount of oil is comparatively small, and, accordingly, a good oil economy may be obtained together with a satisfactory oil replenishment rate.

The oil temperature used when working in accordance with this embodiment of the invention may be any temperature in the range of 100 to 250° C., but in general, it is preferred that the oil temperature when initially contacting the yeast feeding material is in the range of 150–210° C., and very good results have been obtained using an initial oil temperature in the range around 180° C. As already indicated further above, the effect of the process of the invention depends on the total set of process variables used, and temperatures as low as 100–150° C. may be used in this preferred embodiment of the invention, provided that the other process variables are adjusted accordingly, e.g. by increasing the proportion of oil to yeast starting material, which may be obtained by increasing the flow rate of the oil or decreasing the introduction rate of the yeast starting material, so that the necessary heat transfer is performed by a relatively greater quantity of oil to compensate for the lower oil temperature. The temperature of the yeast starting material, which is often preheated, will also have a certain influence on the necessary oil temperature to be used in a particular operation. If very low oil temperatures are used, it may be necessary or desirable to allow pressure release of the mixture to a subatmospheric pressure by applying vacuum at the point where the mixture is discharged from the reactor, in order to secure proper evolution and removal of water vapor from the yeast. If very high oil temperatures are used, it may be desirable or necessary to secure a high rate of oil replacement because of the higher rate of oil decomposition, and/or to take precautions to minimize the oil decomposition, e.g. by adding an antioxidant to the oil or by minimizing or avoiding exposure of the recycled oil to air oxygen, which may be obtained by working under an atmosphere of inert gas in the operations carried out after the pressure release.

The pressure in the reactor may be below, at or above atmospheric pressure. Subatmospheric pressures in the reactor may be necessary in cases where the oil temperature is low. When the outlet from the reactor is simply an open end thereof, and the pressure release is to atmospheric pressure, the total pressure in the reactor will be atmospheric plus the pressure conditioned by the velocity of the flowing mixture; this total pressure will be above but normally very close to atmospheric pressure. Superatmospheric pressure conditions in the reactor may be obtained by limiting the outlet opening of the reactor, e.g. by using an adjustable valve.

By applying in this manner a moderate superatmospheric pressure, e.g. of the order of one atm. gauge, a more vigorous expansion after the pressure release will result; due to the more vigorous expansion, a product having a finer particle structure may be obtained, and this measure is therefore highly preferred.

In this as well as any other embodiment of the process of the invention it may be advantageous to add an emulsifier to the oil. As examples of suitable emulsifiers may be mentioned fatty acid esters, e.g., sorbitol fatty acid esters, such as sorbitol oleates and lecithin, high molecular weight alcohols, e.g., stearin alcohol and wax alcohols, and alkaline earth metal soaps such as magnesium palmitate and calcium oleate, and aluminium soaps. As a specific example of a very suitable emulsifier may be mentioned Homodan® PT, which is a partial polyglycerol ester of dimerized fatty acids of soya bean oil.

In this as well as any other embodiment of the invention it may, furthermore, be desirable to add salt to enhance the palatability of the product. The salt may be added to the yeast starting material before subjecting the same to the process, or to the yeast product prepared by the process.

Because of the especially advantageous heat economy obtainable by this preferred embodiment of the process, it is contemplated that it may prove advantageous also as a general process for drying fodder yeast as a replacement of the conventional roller drying process. Calculations have indicated that the heat consumption per unit of dry yeast product is the same for this preferred embodiment of the process according to the invention as for the roller drying process provided that the equipment is properly heat insulated, and that the former process will have an even significantly better heat economy than the roller drying process when the waste steam is utilized for preheating the yeast cream. Another major advantage of the process of the invention in comparison with the roller drying is the fact that the resulting yeast product has a far better taste than roller dried yeast and thus may be more appetizing to the animals.

The invention also relates to an apparatus for carrying out the above advantageous embodiment of the process. This apparatus comprises an elongated tubular reactor, means for passing oil through said tubular reactor towards one end thereof, means for heating the oil, means for introducing yeast starting material into the tubular reactor at a point spaced from the said end thereof, receptacle means for receiving the mixture discharged from the reactor and permitting substantial expansion so as to allow a substantial part of the steam originating from the water contents of the yeast starting material to escape from the mixture, separating means connected to said receptacle means for separating oil from the processed yeast, and means for recycling at least part of said separated oil to the tubular reactor.

As indicated above, the vigorous agitation of the mixture in the elongated tubular reactor may be provided simply by the turbulence of the flowing mixture. The agitation may, however, also be obtained or enhanced in other manners, for example, by means of baffle plates inserted in the tubular reactor. It is also possible to use a tubular reactor having variations of cross section area or bends or angles resulting in sudden changes in flow direction to obtain special agitation effects or other desired effects.

The discharging end of the tubular reactor may be of any suitable form and may, for example, be provided simply by the tube orifice or by one or more perforations in the tube wall. Preferably, however, the discharging end of the reactor is equipped with an adjustable valve by means of which the pressure in the reactor and, accordingly, the severity of the pressure release can be controlled.

The receptacle means may, for example, be in the form of a cylindrical container of greater diameter than the elongated tubular reactor and surrounding the open end of the elongated tubular reactor, or it may suitably be a container having a conical lower part from which the mixture of oil and processed yeast may flow to the separating means.

In accordance with an especially preferred embodiment, the receptacle means is of the cyclone type. This type of receptacle permits an especially effective separation and recovery of yeast and oil particles entrained by the steam. If necessary, a series of two or more cyclones may be used.

The separating means may be of the same type as mentioned above in connection with the other apparatus of the invention. Another interesting separating means usable for this embodiment is a combination of a hydrocyclone and one or more filter centrifuges. The heating means may be of any suitable type, for example, gas or oil burners or heat exchangers.

Depending upon the process and separation conditions, the yeast product separated from the oil or fat after performing any of the embodiments of the process of the invention is obtained as granules or as a powder or as a mixture of granules and powder. Under some circumstances, however, a more compact product may be obtained, which, if necessary, may be pulverized, e.g. by disintegration or grinding.

Accordingly, the product obtained by the process of the invention consists of yeast in powdery or granular form substantially deprived of water and constituents objectionable with respect to taste and odor and removable by water distillation at elevated temperatures, said yeast product containing or not containing salt in addition to the constituents derived from the yeast, and containing a more or less considerable amount of edible fat not derived from the yeast. The invention also relates to a product having the above characteristics. The product has a water content below 15%, preferably a water content below 5%. In comparison with fresh yeast, the riboflavin content of the product is generally substantially unchanged, whereas the thiamine content is usually somewhat reduced.

The product of the invention may be used as such or in admixture with desirable spices or other palatable additions or it may be used as a constituent of or an addition to meat products such as sausages, meat dumplings, luncheon meat, force meat, liver paste or ready-made dinner dishes in which the product completely or partially replaces minced meat or other sources of protein.

Likewise, the product may be used in bread, biscuits, snacks, and the like.

Finally, the product may also be used as a feed for animals, fish and birds.

The invention also relates to food or feed products consisting of the yeast product, and to food or feed products containing the yeast product as a constituent. Furthermore, the invention relates to the use of the yeast product in articles of human nutrition and animal feed.

Figure 2:
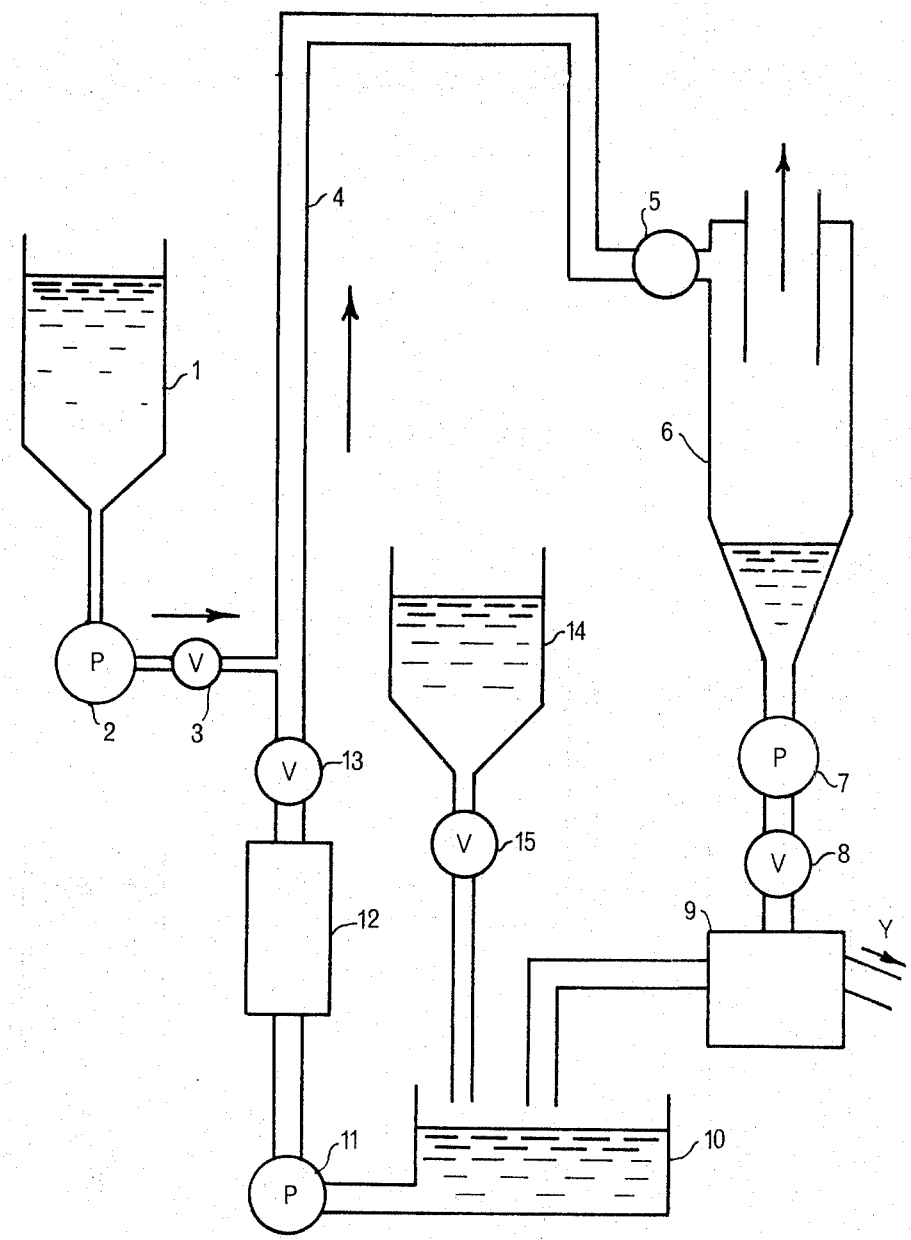

The invention will be further described with reference to the drawings, in which FIG. 1 diagrammatically shows one embodiment of an apparatus according to the invention, and FIG. 2 diagrammatically shows a more preferred embodiment of an apparatus according to the invention.

Reference is made to FIG. 1. From a yeast reservoir or yeast producing plant 1, yeast in a suitable form, preferably yeast cream, is passed through a conduit 2 and a valve Va to a container 3 containing a bath of oil. The oil bath is agitated by a propeller 4 driven by a motor M and is heated by a burner 5. When the yeast starting material is introduced into the hot oil, vigorous steam evolution takes place. The steam may be allowed to simply escape into the surrounding atmosphere, or it may be removed through suitable conduits (not shown) and used for heating purposes, for example for heating the yeast cream feed. When a substantial part of the water content has been removed from a portion of the yeast, the vigorous steam evolution from this portion stops, and the resulting yeast product sinks down through the oil and enters into a conduit 6 communicating with a separating means 7, for example a decanter or a couple of filter centrifuges. If a couple of filter centrifuges is used, a valve Vb in the conduit 6 may be adapted so as to shift the current of oil and yeast product from one centrifuge to the other, when the first one has been filled with product. From the separating means, the final yeast product may be removed, as indicated by the arrow Y, while the oil separated from the product is withdrawn by a pump P and recycled to the container through a conduit 8. A temperature sensing device 9 subjected to the temperature of the oil bath communicates with a suitable control device C governing the function of the valve Va, which may, for example, be a magnetic valve, whereby the yeast feed rate may be controlled in dependency of the bath temperature, the yeast feed rate being diminished or reduced to zero when the temperature of the oil bath tends to become too low. Fresh replenishment oil is brought into the system through a conduit 10, the replenishment rate being governed through suitable valves or other control means (not shown).

Reference is now made to FIG. 2 of the drawing. From a yeast reservoir or yeast producing plant 1, yeast cream is pumped by a pump 2 through a valve 3 into a tubular reactor 4, in which a current of hot oil is moving in the direction indicated by the arrow. The resulting mixture of yeast cream, hot oil and water vapor passes through the reactor 4, from which it is discharged through an adustable throttle valve or other suitable adjustable pressure throttling means 5 into a receptacle 6, preferably (as shown) a cyclone. The adjustable pressure throttling means may be open so as to allow free passage of the mixture, or it may limit the outlet from the reactor to a lesser or greater extent to regulate the severity of the pressure release. The steam is allowed to escape into the surrounding atmosphere, or it is withdrawn from the cyclone 6 through conduits (not shown) and is preferably used for heating purposes, for example for heating the yeast cream feed or the oil feed. The mixture of oil and processed yeast is pumped from the cyclone 6 by a pump 7 through a valve 8 into a separating means 9, which may, for example, be a decanter, one or more filter centrifuges, one or more hydrocyclones, or a combination thereof. If a couple of filter centrifuges is used, the valve 8 may be adapted so as to shift the current of yeast product and oil from one centrifuge to the other one when the first one has been filled with product. From the separating means 9, the yeast product may be removed as indicated by the arrow Y, while the oil separated from the yeast product is passed to an oil reservoir 10, from where it is pumped by a pump 11 through a heating device 12, which is, e.g., oil or gas burners to which part of the outside of the oil conduit is exposed, or a heat exchanger. From the heating device, the oil proceeds through a valve 13 into the reactor 4 for contact with fresh yeast feed material. Replenishment oil is introduced into the system from an oil source 14 through a valve 15. If desired, the function of the pumps 2 and 11 and/or the valves 3 and 13 as well as the heating function of the heating device 12 may be controlled automatically or semi-automatically by control means operating in response to essential data, e.g., temperautre and velocity data measured by suitable devices.

The following examples illustrate the invention, but are not to be considered as limiting the scope of the invention. The crude protein content values stated in the examples were calculated as percent of nitrogen in dry matter multiplied by 6.25. For all of the examples, the percentages stated are percent w./w., unless otherwise specifically indicated.

Examples 1 and 2 were carried out using a simple open boiler heated by a gas burner, while Examples 3–8 were carried out in an apparatus of the type shown in FIG. 1, the separating means being one filter centrifuge. As the centrifuge needed periodical emptying, it was necessary to stop the withdrawal of oil and yeast product from the container 3 when the centrifuge had been filled. The control device (C) and the temperature sensing device 9 were adapted to communicate in such a manner with the valve (Va) that the temperature of the oil bath was maintained as constant as possible at the desired value (stated in the respective examples).

EXAMPLE 1

200 g. of compressed yeast was mixed with 8 g. of salt, and the resulting yeast cream was slowly, in the course of about 5 minutes, and under vigorous stirring, poured into 0.5 liter of corn oil heated to 165° C. The treatment was continued under vigorous stirring for about 2 minutes at 165° C. The yeast product was separated by filtration. The oil content of the yeast product was about 15%.

EXAMPLE 2

The procedure of Example 1 was repeated, only substituting lard for the corn oil.

EXAMPLE 3

Oil: 4 liters of peanut oil.
Oil temperature: 165° C.
Yeast: Compressed yeast, dry matter content 26.68%, crude protein content 47.1%.

350 g. of yeast was mixed with 150 ml. of water, and the resulting yeast cream (about 500 ml.) was placed in the yeast cream reservoir 1 from which it was admitted to the oil bath through the valve (Va) and the conduit 2 in the course of about 13 minutes, whereafter the gas supply to the burner 5 was stopped. After a further 2 minutes, the withdrawal valve (Vb) was closed, and the product was centrifuged for a further 5 minutes. Thereafter, the product was removed from the centrifuge. The product was mixed with 3.6 g. of salt in a mortar.

There was obtained 108 g. of product containing 8.7% of oil, 4.8% of water, and 40.2% of crude protein.

EXAMPLE 4

The procedure of Example 3 was repeated, the only difference being that the peanut oil contained 4% of Homodan® emulsifier (a partial polyglycerol ester of dimerized fatty acids of soya bean oil). The texture of the yeast product was slightly improved in comparison with the product of Example 3.

EXAMPLE 5

Oil: 4 kg. of partially hydrogenated palm oil containing 200 p.p.m. of BHA as antioxidant.
Oil temperature: 165° C.
Yeast: Compressed yeast, dry matter content 28.98%.

175 g. of yeast was mixed with 75 ml. of water, and the resulting yeast cream (about 250 ml.) was placed in the yeast reservoir. The yeast cream was admitted to the oil in the course of 6 minutes, whereafter the gas supply to the burner was stopped. After a further 2 minutes, the withdrawal valve was closed, and after centrifuging for a further 5 minutes, the product was collected. The product was mixed with 1.8 g. of salt.

There was obtained 55 g. of product containing 8.0% of oil and 3.5% of water.

EXAMPLE 6

Oil: 4 kg. of partially hydrogenated, deodorized fish oil.
Oil temperature: 175° C.
Yeast: Waste yeast from the production of alcohol from molasses, dry matter content 31.08%.

The same procedure as described in Example 5 was followed. The resulting product contained 7.5% of oil and 1.9% of water.

EXAMPLE 7

Oil: 4 liters of corn oil.
Yeast: Compressed yeast, dry matter content 27.32%.

75 g. of yeast was mixed with 35 ml. of water, and the resulting yeast cream was added to the oil bath at such a rate that the mean residence time was only 20 seconds. The starting temperature of the oil bath was about 175° C., and during the process the oil temperature was maintained above 165° C. by vigorous heating.

The resulting product (20 g., water content 2.3%) was distinguished by an especially light color and a less significant "fried" flavor than the products of Examples 1–6.

EXAMPLE 8

The procedure of Example 7 was repeated, only substituting partially hydrogenated palm oil for the corn oil.

Yeast products prepared according to the above examples have been used for shelf life tests and for preparing food products:

Shelf life tests

Samples of the product of Example 5 were used for shelf life tests. The samples were stored in small plastic bags at the temperatures stated in the below Table I and for the storing periods indicated in the table. The evaluation values stated in the table are the results of peroxide determinations carried out in accordance with the thiobarbituric acid method.

TABLE I

| Storing period, months | Storing temperature of— | | Remarks |
|---|---|---|---|
| | 18° C. | 30° C. | |
| 0 | 0.150 | 0.150 | The fresh product. |
| 2 | 0.170 | | No change of flavor. |
| 3 | | 0.242 | Do. |
| 4 | 0.243 | | Do. |
| 6 | | (¹) | Flavor not unpleasant, but different from flavor of fresh sample. |
| 7 | (¹) | | Flavor somewhat different from flavor of fresh sample. |

¹ See remark.

Food products prepared with the yeast product of the invention and organoleptic evaluation thereof (I) Meat balls.—200 g. of meat was minced by 8 passages through a mincing machine, and 35 g. of wheat flour, 6 g. of chopped onions, 4 g. of salt and 0.5 g. of sodium glutaminate were added. The resulting mixture was divided into three samples of 75 g. each. Two of the samples were admixed with processed yeast (prepared in accordance with Example 2) and each sample with milk in the amounts stated below, whereafter the resulting mixtures were kneaded for 15 minutes and shaped into balls, which were boiled for 20 minutes.

Sample A: Was admixed with 75 ml. of milk. The total weight of the meat balls after boiling was 120 g.

Sample B: Was admixed with 7 g. of processed yeast product and 85 ml. of milk. The total weight of the meat balls after boiling was 150 g.

Sample C: Was admixed with 14 g. of processed yeast product and 95 ml. of milk. The total weight of the meat balls after boiling was 169 g.

As appears from the above, the amounts of processed yeast product added to samples B and C were about 10% and 20%, respectively, calculated on the meat weight.

The calculated liquid binding capacities of the processed yeast product are as follows:

Sample B:
$$\frac{(85-75)\times 100\%}{7}=143\%$$

Sample C:
$$\frac{(95-75)\times 100\%}{14}=143\%$$

This means that the processed yeast product has a liquid binding capacity of its own weight multiplied by a factor of 1.43.

Table II, below, shows the dry matter content of the meat balls before and after boiling, and the dry matter content of the water used for boiling the meat balls.

TABLE II

| Sample | Dry matter content, percent | | |
|---|---|---|---|
| | Meat balls | | Water |
| | Before boiling | After boiling | |
| A | 26.54 | 24.90 | 0.748 |
| B | 30.40 | 26.06 | 0.884 |
| C | 31.52 | 27.68 | 1.382 |

The meat balls were evaluated organoleptically by a testing panel consisting of a number of persons. Some of the members of the testing panel had considerable experience from previous organoleptic tests; in the following, this subgroup of persons is referred to as "the experienced testing panel." The evaluations were expressed in accordance with a scale ranging from 1 to 5 after the following directives: Odor, taste, color: maximum evaluation 5. Consistency: 3: normal; lower than 3: too soft; higher than 3: too firm.

Table III, below, contains the mean evaluation values for the three samples. The numbers in parentheses are the mean values for the evaluations by the experienced testing panel.

TABLE III

| Sample | A | B | C |
|---|---|---|---|
| Odor | 3.6 (3.8) | 4.0 (4.0) | 3.9 (4.2) |
| Taste | 3.9 (4.0) | 4.0 (3.8) | 3.9 (4.2) |
| Consistency | 2.9 (2.6) | 2.9 (2.8) | 3.0 (3.0) |
| Color | 3.6 (4.0) | 4.0 (4.0) | 3.2 (4.0) |

It appears from the above that Sample C containing an admixture of 20% of processed yeast is preferred by the experienced test panel, and that the liquid binding capacity of the processed yeast is even somewhat greater than the value calculated above.

(II) Liver paste.—3 portions of liver paste having different contents of processed yeast product (prepared in accordance with Example 2) were prepared. The compositions of the samples were as follows:

| Portion | A | B | C |
|---|---|---|---|
| Liver, g | 100 | 85 | 70 |
| Processed yeast product, g | 0 | 15 | 30 |
| Fat, g | 60 | 57.75 | 55.5 |
| Flour, g | 12.5 | 12.5 | 12.5 |
| Shortening, g | 12.5 | 12.5 | 12.5 |
| Milk, ml | 100 | 110 | 120 |
| Egg, g | 19 | 19 | 19 |
| Salt, g | 2.3 | 1.2 | 0 |
| Pepper, g | 0.2 | 0.2 | 0.2 |
| Allspice, g | 0.1 | 0.1 | 0.1 |

As appears from the above, the amount of liver, which was replaced with processed yeast product in the portions B and C were about 15% and 30%, respectively.

The calculated binding capacities of the processed yeast product are $$\frac{(110-100)\times 100\%}{15}=67\%$$

in portion B, and $$\frac{(120-100)\times 100\%}{30}=67\%$$

in portion C.

Table IV, below, shows the dry matter content of the liver pastes before and after baking. The liver pastes were baked for 1½ hours in a water bath in an oven at 175° C.

TABLE IV

| Portion | Dry matter content, percent | |
|---|---|---|
| | Before baking | After baking |
| A | 43.3 | 54.9 |
| B | 43.4 | 53.6 |
| C | 45.2 | 55.2 |

The liver paste portions were evaluated by a testing panel after the same directives as mentioned in connection with meat balls. The results are listed in Table V.

TABLE V

| Portion | A | B | C |
|---|---|---|---|
| Odor | 4.8 (4.6) | 4.3 (4.5) | 3.6 (3.8) |
| Taste | 4.5 (4.6) | 4.3 (4.2) | 3.5 (3.8) |
| Consistency | 3.1 (3.0) | 3.2 (3.0) | 3.2 (3.0) |
| Color | 4.2 (4.6) | 4.2 (4.6) | 4.2 (4.5) |

The evaluations confirm that the calculated liquid binding capacities are correct.

(III) Potato dumplings:

Ingredients:
- Potato flakes _____ g__ 72.25
- Processed yeast product (prepared in accordance with Example 2) _____ g__ 12.75
- Chopped onion _____ g__ 28.5
- Salt _____ teaspoonful__ ½
- Pepper _____ g__ 0.2

To the above mixture, 250 ml. of water was added, and the resulting composition was whipped with one egg, was allowed to stand for 2 minutes and was thereafter fried like dumplings for 12 minutes at a low flame.

The dumplings were evaluated by a testing panel after the same directives as mentioned in connection with meat balls. The evaluation values were:

- Odor _____ 4.4 (4.4)
- Taste _____ 4.0 (4.1)
- Consistency _____ 1.9 (2.5)

(IV) Mashed potatoes enriched with processed yeast product:

Ingredients:
- Potato flakes _____ g__ 20.25
- Processed yeast product (prepared in accordance with Example 2) _____ g__ 2.25
- Water _____ ml__ 79
- Milk _____ ml__ 34

Salt and shortening in amounts as conventionally used in mashed potatoes.

The mashed potatoes product was cooked in a conventional manner and was evaluated by a testing panel after the same directives as mentioned in connection with meat balls.

The evaluation values were:

- Color _____ 4.0 (3.8)
- Odor _____ 3.4 (3.3)
- Taste _____ 3.6 (3.3)
- Mealyness _____ 3.2 (3.3)
- Consistency _____ 3.0 (3.0)

(V) Dog food:

Ingredients:
- Processed yeast product _____ g__ 25
- Fat _____ g__ 5
- Flour _____ g__ 10
- Milk _____ ml__ 30

The mixture was shaped into balls and boiled for 10 minutes. 31.9 g. of balls were obtained.

2 dogs out of 3 ate the balls with pleasure.

(VI) Pommes croquettes enriched with processed yeast product:

Ingredients:
- Carboxymethylcellulose _____ g__ 0.5
- Milk powder _____ g__ 2.5
- Salt _____ g__ 2
- Processed yeast product _____ g__ 10
- Potato flakes _____ g__ 40
- Water _____ ml__ 110

The above ingredients were mixed to a dough, which was extruded into small sticks, and the small sticks were deep-fat fried.

Two portions of pommes croquettes were made, one (portion A) using the processed yeast product of Example 5 and the other one (portion B) using the processed yeast product of Example 8.

The two portions were evaluated organoleptically by an experienced testing panel, and the evaluation ratings for each portion were summed up. The resulting rating sums were 11 for portion A and 17 for portion B; in other words, the portion containing yeast product treated for only 20 seconds was clearly preferred to the portion containing yeast product treated for several minutes.

In similar tests carried out with boiled meat balls, the product containing the processed yeast of Example 5 obtained a rating sum of 7, while the product containing the processed yeast of Example 8 (treated for only 20 seconds) obtained a rating sum of 9.

Examples 9–21 were carried out using an apparatus similar to the one shown in FIG. 2, the separating means 9 being a filter centrifuge, and the valve 5 being fully open. The reactor 4 was a tube having an inside diameter of 22 mm. and a length of 3.8 m. By means of the pump 11, the oil was pumped into the reactor at a rate of 3.2–3.3 liters/min. In Examples 9–15 and 17–21, the yeast starting material was a yeast cream prepared from 750 g. of compressed yeast having a dry matter content of about 28%; in Example 16, the yeast starting material was a special yeast cream having a dry matter content of 16% prepared from 315 g. of Candida mycoderma cells and 250 ml. of water. In Examples 16–20, the oil used was hardened palm oil; in all the other examples, the oil was soya bean oil. The temperature of the yeast starting material and the introduction rate thereof appear from Table VI below, which also contains information about the temperature of the oil when leaving the heater 12 and when leaving the centrifuge 9, respectively. The residence time of the yeast in the reactor is also stated in Table VI for each of the examples: these residence times were calculated on the basis of the volume of the reactor and the volume of oil feed and yeast feed and of the water vapor liberated in the reactor. It will be appreciated from Table VI that very short to ultrashort treating times have been obtained. For each of the products obtained, Table VI contains values of an organoleptic evaluation of the product itself carried out using the same rating system as referred to above.

TABLE VI

| Example number | Yeast starting material | | Oil | | Residence time of yeast in reactor, sec. | Product | | | | |
| | Temperature, °C. | Introduction rate, ml./min. | Heated to, °C. | Recycled, °C. | | Dry matter content, percent | Evaluation | | | Remarks |
| | | | | | | | Color | Consistency | Odor and taste | |
| 9 | 58 | 23 | 180 | 148 | 2.3 | 99.00 | 3 | 3½ | 3½ | A little "burnt" taste. |
| 10 | 54 | 35 | 180 | 140 | 1.7 | 99.03 | 3 | 3½ | 3½ | Do. |
| 11 | 51 | 50 | 183 | 137 | 1.2 | 98.16 | 3½ | 3½ | 3½ | Do. |
| 12 | 47 | 81 | 180 | 131 | 0.7 | 97.43 | 4 | 4 | 4 | |
| 13 | 56 | 106 | 179 | 119 | 0.6 | 95.54 | 3 | 4 | 4 | |
| 14 | 55 | 106 | 205 | 143 | 0.6 | 99.39 | 5 | 3 | 5 | |
| 15 | 75 | 100 | 175 | 135 | 0.6 | 97.57 | 4 | 2 | 4 | |
| 16 | 42 | 33 | 200 | 144 | 1.7 | 95.17 | 1 | 4 | 1½ | |
| 17 | 67 | 75 | 183 | 126 | 0.8 | 95.30 | 4 | 4 | 3 | |
| 18 | 68 | 75 | 210 | 151 | 0.8 | 99.23 | 5 | 3 | 3 | Do. |
| 19 | 54 | 75 | 235 | 171 | 0.7 | 99.46 | 4 | 3 | 3 | "Burnt" taste. |
| 20 | 47 | 75 | 233 | 147 | 0.8 | 99.00 | 4 | 2 | 3 | |
| 21 | 54 | 80 | 263 | 168 | 0.7 | 99.19 | 2 | 2 | 3 | Very "burnt" taste. |

The product of Example 12 was used for preparing biscuits. The following recipe was used:

| | | |
|---|---|---|
| Flour | g | 150 |
| Processed yeast product | g | 100 |
| Sugar | g | 37.5 |
| Salt of harts horn | g | 5 |
| Salt | g | 2.5 |
| Shortening | g | 60 |
| Water | ml | 100 |

The biscuits were baked at 210° C. for 6–8 minutes. In the organoleptic evaluation, the biscuits obtained the maximum rating of 5 for odor and taste and for color and the rating of 3 (the best rating obtainable) for consistency.

We claim:

1. A process for preparing an edible yeast product, comprising contacting a yeast cream consisting essentially of yeast and water with an edible oil or fat to form a reaction mixture, said oil or fat upon initial contact with said yeast cream having a temperature of 150–210° C. and being vigorously agitated by positively applied conditions of vigorous agitation with a rapidly moving agitator means or by rapid turbulent flow in an elongated tubular reactor, maintaining said contact and said vigorous agitation for a treating time sufficient to reduce the water content of said yeast to less than about 15% by weight, calculated on the yeast dry matter, and separating oil from the yeast to obtain a uniform, non-agglomerating yeast product having good flavor and stability.

2. A process according to claim 1, wherein the contact is maintained for a period of time sufficient to reduce the water content of the yeast to less than 5% by weight, calculated on the yeast dry matter.

3. A process according to claim 1, wherein the yeast cream is continuously added little by little to a vigorously agitated oil bath heated to the contacting temperature, while a current of the resulting reaction mixture is continuously withdrawn from the bath, and the yeast product is continuously recovered from said withdrawn mixture.

4. A process according to claim 3, wherein part of the oil forming part of the withdrawn mixture is recycled to the oil bath.

5. A process according to claim 4, wherein the oil temperature is maintained in the desired range by means of a temperature sensing device subjected to the bath temperature, said device controlling the oil heating rate.

6. A process according to claim 4, wherein the oil temperature is maintained in the desired range by means of a temperature sensing device subjected to the bath temperature, said device controlling the feeding rate of the yeast cream to the bath.

7. A process according to claim 1, wherein said yeast cream is contacted with said oil by introducing said yeast cream into a current of oil, the resulting reaction mixture is passed through an elongated tubular reactor under said conditions of vigorous agitation, pressure release of the mixture being allowed at a downstream end of the reactor, whereby a substantial part of the stream originating from the water content of the yeast cream escapes from the mixture, and the resulting yeast product is recovered from the mixture.

8. A process according to claim 1, wherein after recovery of the yeast product, part of the oil of the mixture is recycled into the reactor so as to contact fresh yeast cream.

9. A process according to claim 1, wherein the vigorous agitation is effected by a rapidly rotating propeller.

10. A process according to claim 1, wherein said oil or fat contains an emulsifier to assist said contact with said yeast cream.

11. The edible yeast product prepared by the process of claim 1.

12. The edible yeast product prepared by the process of claim 8.

References Cited

UNITED STATES PATENTS

| | | | |
|---|---|---|---|
| 1,569,383 | 1/1926 | Lindsey | 99—406 |
| 1,802,645 | 4/1931 | Gove et al. | 426—346 |
| 2,523,483 | 9/1950 | Stern | 426—62 |
| 2,919,194 | 12/1959 | Johnston | 426—48 |
| 3,423,210 | 1/1969 | Martino | 426—233 |

DAVID M. NAFF, Primary Examiner

PO-1050
(5/69)

UNITED STATES PATENT OFFICE
CERTIFICATE OF CORRECTION

Patent No. 3,782,967     Dated January 1, 1974

Inventor(s) Bjorn Westphal Eriksen et al

It is certified that error appears in the above-identified patent and that said Letters Patent are hereby corrected as shown below:

Column 1, line 56, delete "eatable" and substitute therefor --edible--.

"product". Column 2, line 20, "essentlal" should read --essential--. Column 2, line 23, "meantain" should read --maintain--. Column 2, line 26, "yeast" (second occurrence) should read --yeasts--. Column 2, line 52, delete "jamata" and substitute therefor --famata--. Column 2, line 54, "carlber" should read --carlsber--. Column 16, line 16, "stream" should read --steam--.

Sbgnea
Signed and sealed this 11th day of June 1974.

(SEAL)
Attest:

EDWARD M. FLETCHER, JR.
Attesting Officer

C. MARSHALL DANN
Commissioner of Patents